United States Patent
Chen (10) Patent No.: US 11,431,160 B2
(45) Date of Patent: Aug. 30, 2022

(54) HYBRID CIRCUIT BREAKER ASSEMBLY

(71) Applicant: Eaton Intelligent Power Limited, Dublin (IE)

(72) Inventor: Steven Zhenghong Chen, Coraopolis, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 274 days.

(21) Appl. No.: 16/885,679

(22) Filed: May 28, 2020

(65) Prior Publication Data
US 2020/0403396 A1 Dec. 24, 2020

Related U.S. Application Data

(60) Provisional application No. 62/863,468, filed on Jun. 19, 2019.

(51) Int. Cl.
*H02H 3/05* (2006.01)
*H01H 33/66* (2006.01)
*H02H 1/00* (2006.01)

(52) U.S. Cl.
CPC ............ *H02H 3/05* (2013.01); *H01H 33/66* (2013.01); *H02H 1/0007* (2013.01)

(58) Field of Classification Search
CPC ........ H02H 3/05; H02H 1/0007; H02H 3/021; H01H 33/66
See application file for complete search history.

(56) References Cited

U.S. PATENT DOCUMENTS

| 6,356,423 B1 | 3/2002 | Hastings et al. |
| 7,369,386 B2 | 5/2008 | Rasmussen et al. |
| 9,276,393 B2 * | 3/2016 | Ostrovsky .............. H02H 3/338 |

(Continued)

FOREIGN PATENT DOCUMENTS

| EP | 2940820 A1 | 11/2015 |
| EP | 3309809 A1 | 4/2018 |

(Continued)

OTHER PUBLICATIONS

Mutzel, T. et al., "New Algorithm for Electronic Short-Circuit Detection", Electrical Contacts—2006. Proceedings of the 52nd IEEE Holm Conference on Electrical Contacts, Sep. 25-27, 2006.

*Primary Examiner* — Adolf D Berhane
*Assistant Examiner* — Afework S Demisse
(74) *Attorney, Agent, or Firm* — Eckert Seamans Cherin & Mellott, LLC (57) ABSTRACT

A hybrid circuit interrupter can be used for medium voltage direct current applications, among other applications. The circuit breaker includes a vacuum circuit interrupter and an electronic power interrupter that are electrically connected in parallel. The vacuum circuit interrupter is normally closed and the electronic power interrupter is normally off, so that current passes through the vacuum circuit interrupter in a non-interrupt mode. When an interrupt condition is detected, the electronic interrupter will turn on, and current will pass through the electronic interrupter as the vacuum interrupter is opened. A current injector may draw current from the vacuum interrupter to the electronic power interrupter. An isolation switch may maintain the system in a non-conducting state when interruption is complete.

18 Claims, 5 Drawing Sheets

(56) References Cited

U.S. PATENT DOCUMENTS

| | | |
|---|---|---|
| 9,973,085 B2 | 5/2018 | Vicquery et al. |
| 2011/0115460 A1 | 5/2011 | Elliott et al. |
| 2014/0184185 A1 | 7/2014 | Torrisi et al. |
| 2016/0294179 A1 | 10/2016 | Kennedy et al. |
| 2016/0359311 A1 | 12/2016 | Handy et al. |
| 2017/0256934 A1 | 9/2017 | Kennedy et al. |
| 2018/0048142 A1* | 2/2018 | Immel ................ B60R 16/03 |
| 2019/0089146 A1 | 3/2019 | Li et al. |

FOREIGN PATENT DOCUMENTS

| | | |
|---|---|---|
| JP | 2003123569 A | 4/2003 |
| WO | 2018109161 A1 | 6/2018 |

* cited by examiner

HYBRID CIRCUIT BREAKER ASSEMBLY

RELATED APPLICATIONS AND CLAIM OF PRIORITY

This patent document claims priority to U.S. Provisional Patent Application No. 62/863,468, filed Jun. 19, 2019 and titled "Hybrid Circuit Breaker Assembly," the disclosure of which is fully incorporated into this document by reference.

BACKGROUND

Circuit breakers, sometimes referred to as circuit interrupters, include electrical contacts that pass current from a source to a load when the contacts physically contact each other. The contacts may be separated in order to interrupt the delivery of current, either in response to a command or to upon detection of an electrical fault condition such as an overvoltage condition, current overload/short circuit, or low voltage condition.

In medium voltage (MV) alternating current (AC) applications, circuit interrupters typically attempt to separate the contacts when the zero crossing of the AC current occurs. An arc may briefly occur from the instant of separation to the instant of the next zero crossing, but at the next zero crossing the arc will be extinguished and circuit interruption will be complete.

Direct current (DC) has no zero crossings. Therefore, interrupting DC current can be difficult, especially in the MV range. MV DC interrupters can require a significant amount of energy to operate. Such systems also become very hot and typically require a cooling fluid to prevent overheating during operation. Although attempts have been made, no suitable systems exist for interrupting MV DC applications.

This document describes methods and systems that are intended to address some or all of the problems described above.

SUMMARY

A hybrid circuit interrupter includes a vacuum circuit interrupter that is electrically connected between a direct current (DC) input line and a load. The vacuum circuit interrupter has a normally closed position during a non-interrupt mode in which current will be passed from the input line to the load. The hybrid circuit interrupter also includes a DC electronic power interrupter that is electrically connected in parallel with the vacuum circuit interrupter between the input line and the load. The DC electronic power interrupter is maintained in an off condition during the non-interrupt mode.

In some embodiments, the hybrid circuit interrupter also includes an isolation switch having an input that is electrically connected to either the inputs or the outputs of the vacuum circuit interrupter and of the DC electronic interrupter. The isolation switch may have a normally closed position during the non-interrupt mode. The hybrid circuit interrupter also may include an output that is electrically connected to the load.

In some embodiments, the hybrid circuit interrupter may include control logic configured to, in response to detecting an interrupt condition: (i) cause the electronic power interrupter to turn on and pass current received from the input line; (ii) after the electronic power interrupter turns on, cause the vacuum circuit interrupter to open; and (iii) after the vacuum circuit interrupter opens, cause the electronic power interrupter switch to turn off and fully interrupt delivery of current from the input line to the load.

In embodiments that include an isolation switch, the hybrid circuit interrupter may include control logic configured to cause the isolation switch to open after the electronic power interrupter turns off and the isolation switch is open, cause the vacuum circuit interrupter to open; and (iv) after the vacuum circuit interrupter opens, cause the DC interrupter switch to operate and interrupt the current received from the input line, thus maintaining the open circuit from the input line to the load.

In various embodiments, the hybrid circuit interrupter also may include a current injector that is electrically connected the electronic power interrupter. The current injector will serve to draw current away from the vacuum interrupter and to the electronic power interrupter as the vacuum interrupter opens. This may occur by activating the current injector before, as or after the DC interrupter turns on and before the vacuum interrupter opens. The current injector will then be deactivated after the vacuum interrupter opens.

In various embodiments, the hybrid circuit interrupter also may include a housing that contains the vacuum circuit interrupter, the electronic interrupter, a control logic circuit and a fault detection circuit.

In various embodiments, the hybrid circuit interrupter also may include a surge arrestor that is connected in parallel actress the electronic power interrupter to limit voltage across the electronic power interrupter as the electronic power interrupter interrupts current flow.

In other embodiments, a method of operating a hybrid circuit interrupter that includes a vacuum circuit interrupter and a DC electronic power interrupter that are electrically connected to each other in parallel is disclosed. The method includes, during a non-interrupt mode, delivering current from an input line to a load via the vacuum circuit interrupter by maintaining the vacuum circuit interrupter in a closed position, and maintaining the electronic interrupter in an off condition that provides an open position. When a control circuit detects an interrupt condition, then in response the control circuit will implement an interrupt mode by: (i) causing the DC electronic interrupter to turn on and pass current from the line to the load; (ii) opening the vacuum circuit interrupter and thus interrupting current flow across the vacuum circuit interrupter; (iii) after the vacuum circuit interrupter has opened, causing the electronic power interrupter to turn off; and (iv) opening an isolation switch that after the electronic power interrupter has turned off. In addition, a current injector may draw current away from the vacuum interrupter and toward the DC electronic interrupter's circuit as the vacuum interrupter is opened. This may occur by activating the current injector before, as or after the DC interrupter turns on and before the vacuum interrupter opens. The current injector will then be deactivated after the vacuum interrupter opens.

DETAILED DESCRIPTION

"Medium voltage" (MV) systems include electrical systems that are rated to handle voltages from about 600 V to about 1000 kV. Some standards define MV as including the voltage range of 600 V to about 69 kV. (See NECA/NEMA 600-2003). Other standards include ranges that have a lower end of 1 kV, 1.5 kV or 2.4 kV and an upper end of 35 kV, 38 kV, 65 kV or 69 kV. (See, for example, IEC 60038, ANSI/IEEE 1585-200 and IEEE Std. 1623-2004, which define MV as 1 kV-35 kV.) Except where stated otherwise, in this document the term "medium voltage" is intended to include the voltage range from approximately 1 kV to approximately 100 kV, as well as all possible sub-ranges within that range.

Other terms used in this document are defined at the end of this description.

Figure 1:
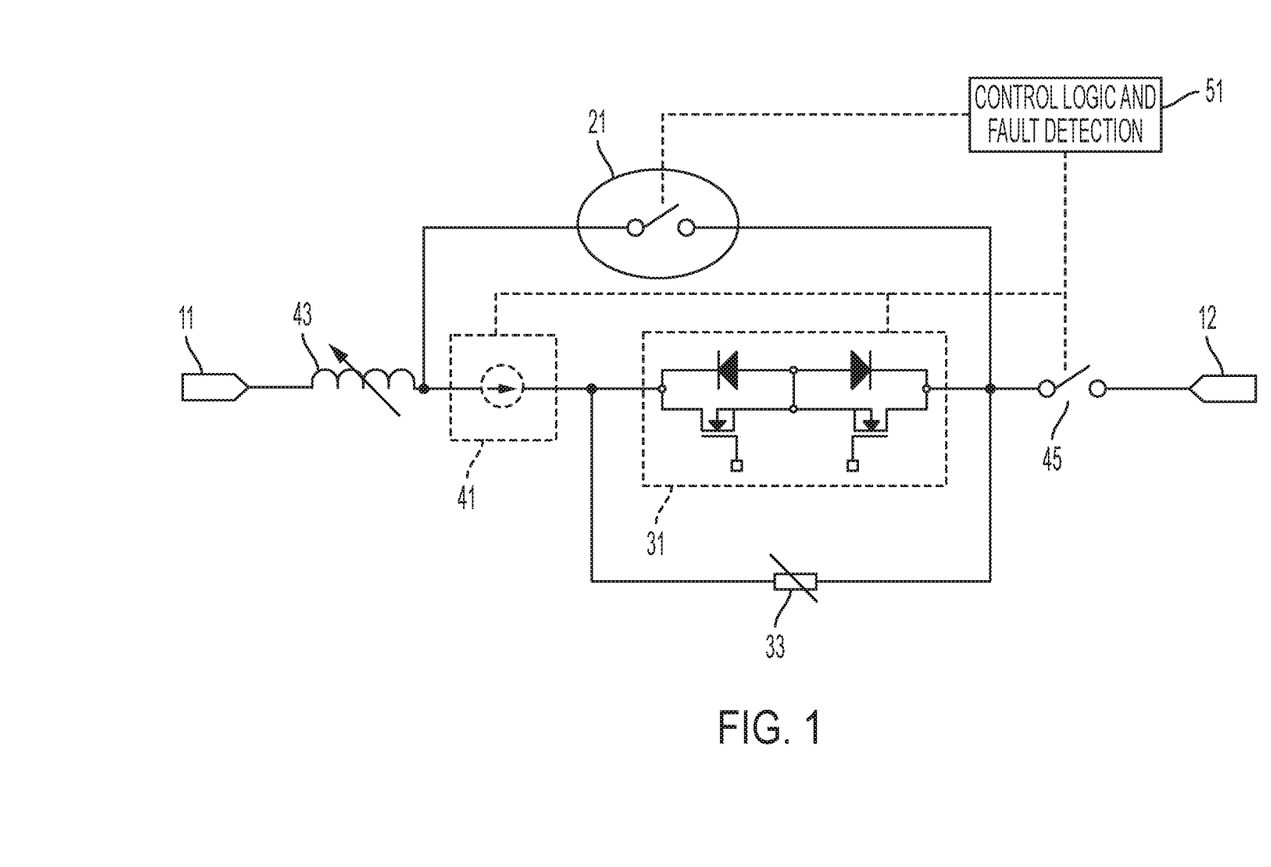
FIG. 1 represents example components of a hybrid circuit breaker.

FIG. 1 illustrates example components of a circuit breaker (which also may be referred to a circuit interrupter) that is configured to pass—and interrupt—the delivery of current from a DC power input line to a load in various embodiments. In the example of FIG. 1, first terminal 11 may lead to the input and second terminal 12 may lead to the load, or the elements may be reversed so that current flow is in the opposite direction. The system includes a vacuum circuit interrupter 21 that is electrically connected between the DC input 11 and the load 12. The system also includes a power electronics branch that includes a DC solid state (i.e., electronic) power interrupter 31 that is electrically connected in parallel with the vacuum circuit interrupter 21, and which also is electrically connected between the DC input and the load. The power electronics branch also may include a transient commutation current injector 41 that can draw current away from the vacuum interrupter circuit 21 by injecting current into the power electronics branch as will be described below.

The system may include an isolation switch 45 with an input terminal that is electrically connected to the inputs or the outputs of the vacuum circuit interrupter 21 and of the DC electronic interrupter 31. The output terminal of the isolation switch 45 is shown as electrically connected to the second terminal 12. However, in some embodiments either terminal of the isolation switch may be instead electrically connected to the first terminal 11 and thus will be positioned between the first terminal 11 and the power electronics branch.

During operation in a typical (i.e., non-interrupt) mode, the vacuum circuit interrupter 21 and isolation switch 45 each will have a normally closed position in which current will be passed from the input line to the load through the vacuum circuit interrupter 21 and the isolation switch 45. In the non-interrupt mode the electronic interrupter 31 will be maintained in an off condition, and substantially no current will pass through it during the non-interrupt mode. The hybrid circuit interrupter will include fault detection circuitry (such as a ground fault sensor) and control logic circuitry 51 that are configured to actuate various components of the circuit upon detection of an interrupt condition. The interrupt condition may be receipt of a command to interrupt the flow of current to the load, or it may be detection of a fault (such as a short-circuit) condition that will trigger interruption of current to avoid damaging the load and/or other components of the system.

Figure 2:
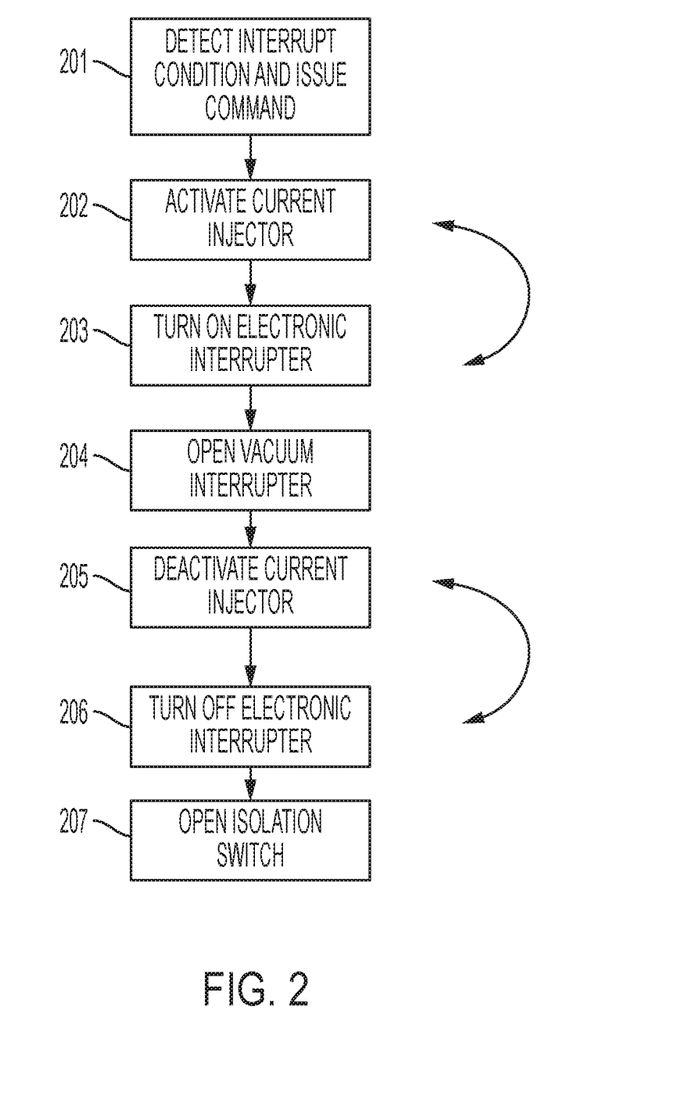
FIG. 2 illustrates an example process of operating a hybrid circuit breaker.

Referring both to FIG. 1 and the process flow diagram of FIG. 2, when the system detects an interrupt condition (step 201) the control logic circuitry 51 will issue a command to cause the transient communication current injector 41 to turn on (step 202), and also to cause the electronic power interrupter 31 to turn on (step 203). These elements of the power electronics branch may be turned on in a sequence in which either element turns on first, or they may be turned on simultaneously. This closes a circuit that parallels the vacuum interrupter so that current will pass through the power electronics branch while the vacuum interrupter 21 is opened (step 204). While the electronic power interrupter 31 may divert some or all of the current from the vacuum interrupter, the current injector 41 helps to ensure a complete diversion of current as the vacuum interrupter 21 opens (step 204). For a very brief period of time (e.g., <1 ms) after the vacuum interrupter 21 opens, the current will continue to pass through power electronics branch and the isolation switch 45 and to the load. The power electronics branch will be turned off by deactivating the current injector 41 (step 205) and turning off the electronic interrupter 31 (step 206), in either order or simultaneously. After commanding the electronic interrupter 31 to turn off (step 206), at step 207 the control logic circuitry 51 also will cause the isolation switch 45 to open the circuit between the line and the load after electronic interrupter 31 cuts off residual current (normally <1 A), if any, and maintain the hybrid circuit interrupter in a non-conducting state.

Closing and opening of the power electronics branch of the circuit will happen very quickly, on the order of 100 µs or less. The vacuum circuit interrupter 21 may be of an ultra-fast type, typically interrupting the current flowing through it in a matter of 0.5 ms or less. However, the invention is not limited to such ultra-fast speeds, and in some embodiments it may operate in a cycle of 100-200 ms.

After the vacuum circuit interrupter 21 opens (step 204), the system will cause the electronic power interrupter 31 to turn off (step 206), and the isolation switch 45 to open (step 207). The current injector 41 also may be turned off at this time (step 205). The system may leave the isolation switch 45 in the open position to ensure that no current leakage occurs from the line to the load through the electronic interrupter. Or, the system may close the isolation switch 45 so long as the other components remain open.

Referring back to FIG. 1, the system may include additional components such as a varistor 33 that is electrically connected in parallel with the electronic interrupter. The varistor 33 can serve the function of a surge arrestor to limit the voltage across the electronic interrupter 31 and absorb any residual current when interrupting occurs. The system also may include a variable inductor 43 that is electrically connected between the line and the inputs of the vacuum circuit interrupter and the electronic interrupter.

The current injector 41 may be positioned upstream of the electronic power interrupter 31 as shown, or it may be positioned downstream of the electronic power interrupter 31. In various embodiments, the current injector 41 may be either unidirectional to handle a single direction of current flow, or it may be bidirectional to handle current flow in either direction.

The electronic interrupter (21 in FIG. 1) may be any suitable solid state DC circuit breaker, such as those that have a medium voltage rating but compact size. Suitable examples are described in U.S. Pat. No. 9,103,852 (Zheng et al), the disclosure of which is fully incorporated into this document by reference.

Figure 3:
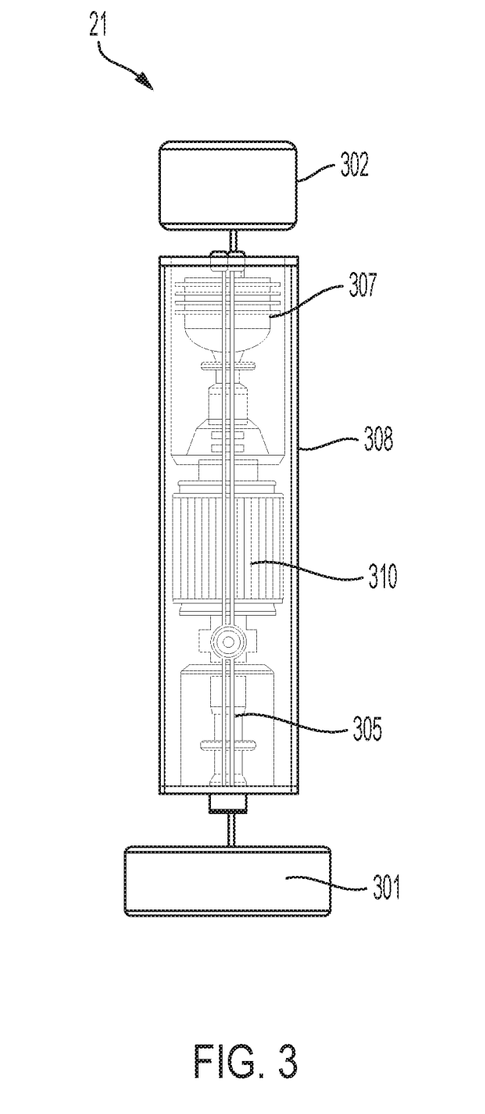
FIG. 3 illustrates example elements of a vacuum circuit interrupter that may be included in a hybrid circuit breaker such as that of FIG. 1.

FIG. 3 illustrates example elements of a system that may include or embody the vacuum circuit interrupter 21 in FIG. 1. Referring to FIG. 3, the vacuum interrupter 21 includes a vacuum chamber 310 that holds a first contact and a second contact. At least one of the contacts is movable, while the other contact may be movable or fixed. A first actuator 301 is operable to cause a first non-conductive drive rod 305 to move toward and away from the vacuum chamber 310, and by doing so the first drive rod can move a first one of the contacts toward and away from the second contact in the vacuum chamber 310. The second contact may be fixed, or alternatively a second actuator 302 may be operable to cause a second non-conductive drive rod 307 to move toward and away from the vacuum chamber 310, and by doing so the second drive rod can also the second contact toward and away from the first contact in the vacuum chamber 310. The movable drive rod and connecting components may encapsulated within a pole unit 308.

Figure 4:
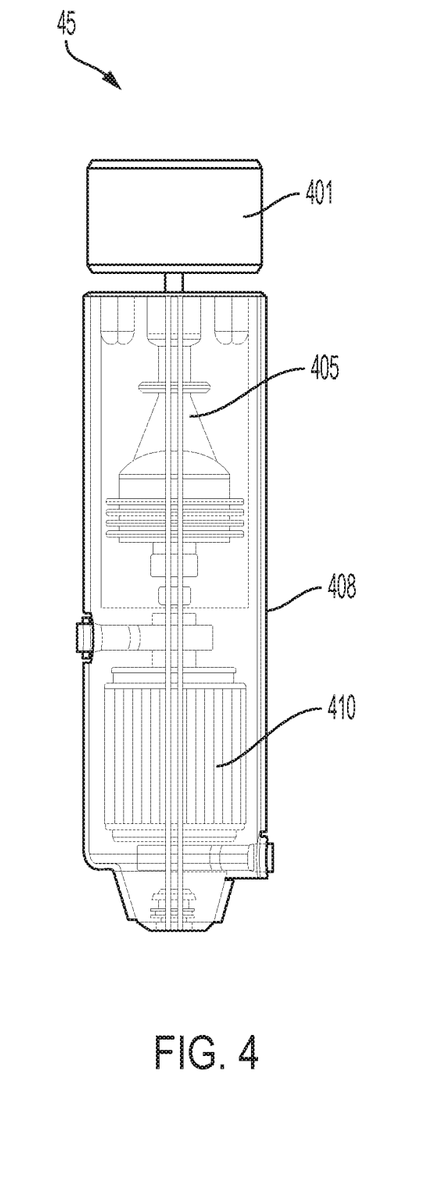
FIG. 4 illustrates example elements of an isolation switch that may be included in a hybrid circuit breaker such as that of FIG. 1.

FIG. 4 illustrates example elements of a vacuum isolation switch that may serve as the isolation switch 45 in FIG. 1. Referring to FIG. 4, the isolation switch 45 includes a vacuum chamber 410 that holds a first contact and a second contact. One of the contacts is movable, while the other contact is fixed. An actuator 401 is operable to cause a first non-conductive drive rod 405 to move toward and away from the vacuum chamber 410, and by doing so the movable drive rod can move the movable contact toward and away from the fixed contact in the vacuum chamber 410. The movable drive rod and connecting components may be encapsulated within a pole unit 408.

Figure 5:
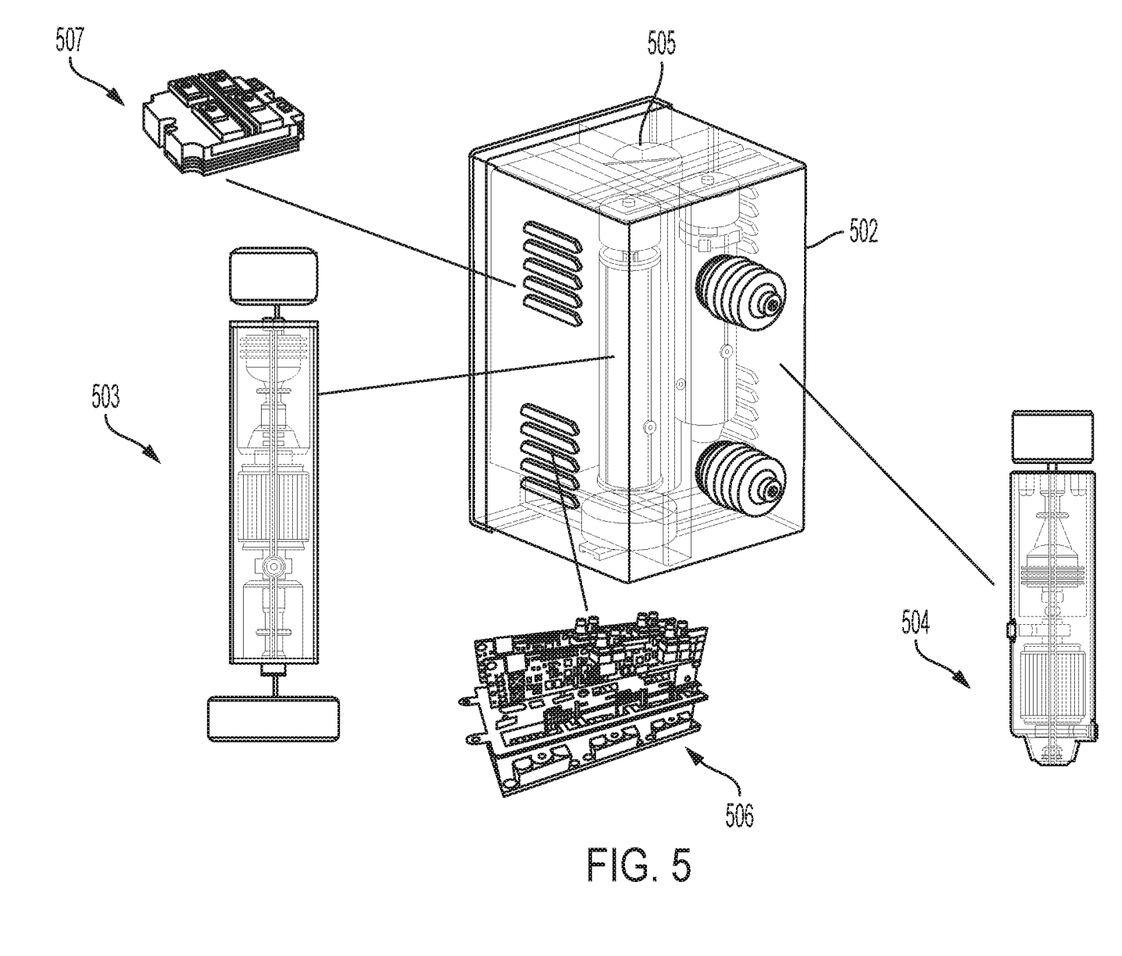
FIG. 5 illustrates example structure of a hybrid circuit breaker system.

FIG. 5 illustrates an example hybrid circuit breaker system 501 in which a housing 502 contains the vacuum circuit interrupter 503, the isolation switch 504, one or more capacitors 505, a housing that contains the current injector 506, and a housing that contains the electronic interrupter 507 with a surge arrestor. The system also may house control logic circuitry and fault detection circuitry, either with other components or in independent housing structure(s). The structural arrangement shown in FIG. 5 is by way of example only, and the invention is not limited to the illustrated arrangement. However, unlike conventional medium voltage switchgear, the system as shown can be very compact, as it does not require separate compartments for releasing energy and/or housing control equipment (although the invention could be used in systems that include such features).

The hybrid circuit breakers described above may, in various embodiments, be rated for medium voltage applications. However, other ratings for other voltage levels may be used in some embodiments.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "electrically connected" means that a conductive path exits between the referenced components, either directly or indirectly through one or more intermediate components.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a direction in which those components are so oriented with respect to each other. The relative orientations of the components may be reversed, or the components may be on the same plane, if the orientation of the structure that contains the components is changed. The claims are intended to include all orientations of a device containing such components.

In this document, values that are described as being approximate, or that are characterized as being "approximately" a value, are intended to include a range of plus or minus 10 percent around the value.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A hybrid circuit interrupter, comprising:
a vacuum circuit interrupter that is:
electrically connected between a direct current (DC) input line and a load, and
configured to have a normally closed position during a non-interrupt mode in which current will be passed from the input line to the load;
a DC electronic power interrupter that is:
electrically connected in parallel with the vacuum circuit interrupter between the input line and the load, and
configured to be maintained in an off condition during the non-interrupt mode; and
a current injector that is electrically connected between the electronic interrupter and the DC input line, upstream of the electronic power interrupter.

2. The hybrid circuit interrupter of claim 1, further comprising control logic that is configured to, in response to detecting an interrupt condition:
cause the electronic power interrupter to turn on and pass current received from the input line;
after the electronic power interrupter turns on, cause the vacuum circuit interrupter to open; and
after the vacuum circuit interrupter opens, cause the electronic power interrupter to turn off and interrupt the current received from the input line, thus interrupting delivery of current from the DC input line to the load.

3. The hybrid circuit interrupter of claim 1, wherein the control logic is further configured to turn on the current injector in response to detecting the interrupt condition and before causing the vacuum circuit interrupter to open.

4. The hybrid circuit interrupter of claim 1, further comprising an isolation switch having:
 an input that is electrically connected to outputs of the vacuum circuit interrupter and of the DC electronic interrupter; and
 an output that is electrically connected to the load,
 wherein the isolation switch is configured to have a normally closed position during the non-interrupt mode.

5. The hybrid circuit interrupter of claim 4, further comprising control logic configured to, in response to detecting an interrupt condition:
 cause the electronic power interrupter to turn on and pass current received from the input line;
 after the electronic power interrupter turns on, cause the vacuum circuit interrupter to open;
 after the vacuum circuit interrupter opens, cause the electronic power interrupter to open and interrupt the current received from the input line, thus interrupting delivery of current from the input line to the load; and
 cause the isolation switch to hold and maintain the hybrid circuit interrupter in a non-conducting state.

6. The hybrid circuit interrupter of claim 4, wherein the control logic is further configured to turn on the current injector in response to detecting the interrupt condition and before causing the vacuum circuit interrupter to open.

7. The hybrid circuit interrupter of claim 1, further comprising a housing that contains:
 the vacuum circuit interrupter;
 the electronic interrupter;
 a control logic circuit; and
 a fault detection circuit.

8. The hybrid circuit interrupter of claim 1, further comprising a surge arrestor that is electrically connected in parallel with the electronic power interrupter and electrically connected between the current injector and the electronic power interrupter.

9. A hybrid circuit interrupter, comprising:
 a vacuum circuit interrupter that is:
  electrically connected between a direct current (DC) input line and a load, and
  configured to have a normally closed position;
 a DC electronic power interrupter that is:
  electrically connected in parallel with the vacuum circuit interrupter between the input line and the load, and
  configured to be maintained in an off condition during normal operation;
 a current injector that is electrically connected between the DC electronic power interrupter and the input line, upstream of the DC electronic power interrupter;
 a fault sensor; and
 control logic that is configured to, in response to the fault sensor detecting an interrupt condition:
  cause the electronic power interrupter to turn on and pass current received from the input line,
  after the electronic power interrupter turns on, cause the vacuum circuit interrupter to open, and
  after the vacuum circuit interrupter opens, cause the electronic power interrupter to turn off and interrupt the current received from the input line, thus interrupting delivery of current from the DC input line to the load.

10. The hybrid circuit interrupter of claim 9, further comprising an isolation switch having:
 an input that is electrically connected to outputs of the vacuum circuit interrupter and of the DC electronic interrupter; and
 an output that is electrically connected to the load,
 wherein the isolation switch is configured to have a normally closed position.

11. The hybrid circuit interrupter of claim 10, further comprising control logic configured to, in response to detecting an interrupt condition:
 cause the electronic power interrupter to turn on and pass current received from the input line;
 after the electronic power interrupter turns on, cause the vacuum circuit interrupter to open;
 after the vacuum circuit interrupter opens, cause the electronic power interrupter to open and interrupt the current received from the input line, thus interrupting delivery of current from the input line to the load; and
 cause the isolation switch to hold and maintain the hybrid circuit interrupter in a non-conducting state.

12. A method of operating a hybrid circuit interrupter that comprises a vacuum circuit interrupter and a DC electronic power interrupter that are electrically connected to each other in parallel, the method comprising:
 during a non-interrupt mode, delivering current from an input line to a load via the vacuum circuit interrupter by:
  maintaining the vacuum circuit interrupter in a normally closed position, and
  maintaining the electronic interrupter in an off condition that provides a normally open position;
 detecting an interrupt condition; and
 by a control circuit, in response to detecting the interrupt condition, implementing an interrupt mode by:
  turning on a current injector, the current injector being electrically connected to the input line and upstream the DC electronic power interrupter,
  causing the DC electronic power interrupter to turn on and pass current from the line to the load,
  opening the vacuum circuit interrupter and thus interrupting current flow across the vacuum circuit interrupter, and
  after the vacuum circuit interrupter has opened, causing the DC electronic power interrupter to open.

13. The method of claim 12,
 further comprising, by the control circuit before the opening the vacuum circuit interrupter, turning on the current injector to draw current away from the vacuum circuit interrupter and to the DC electronic power interrupter.

14. The method of claim 13, wherein turning on the current injector occurs before turning on the DC electronic power interrupter.

15. The method of claim 13, wherein turning on the current injector occurs after turning on the DC electronic power interrupter.

16. The method of claim 13, wherein:
 the hybrid circuit interrupter further comprises an isolation switch having a normally closed position; and
 the method further comprises, after the DC electronic power interrupter opens, opening the isolation switch to maintain the hybrid circuit interrupter in a non-conducting state.

17. The method of claim 13, wherein further comprising a surge arrestor that is electrically connected in parallel with the electronic power interrupter; and
 the method further comprises, by the surge arrestor, limiting a level of voltage across the electronic power interrupter as the electronic power interrupter interrupts the current flow, the surge arrestor being electrically connected between the current injector and the electronic power interrupter.

18. The method of claim 12, wherein:

the hybrid circuit interrupter further comprises an isolation switch having a normally closed position; and the method further comprises, after the DC electronic power interrupter opens, opening the isolation switch to maintain the hybrid circuit interrupter in a non-conducting state.

* * * * *